(12) United States Patent
Mooser

(10) Patent No.: US 9,734,178 B2
(45) Date of Patent: *Aug. 15, 2017

(54) SEARCHING ENTITY-KEY ASSOCIATIONS USING IN-MEMORY OBJECTS

(71) Applicant: Facebook, Inc., Menlo Park, CA (US)

(72) Inventor: Jonathan Mooser, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/698,622

(22) Filed: Apr. 28, 2015

(65) Prior Publication Data

US 2015/0248447 A1    Sep. 3, 2015

Related U.S. Application Data

(63) Continuation of application No. 13/681,347, filed on Nov. 19, 2012, now Pat. No. 9,047,328.

(51) Int. Cl.
*G06F 17/30* (2006.01)

(52) U.S. Cl.
CPC .............................. *G06F 17/30321* (2013.01)

(58) Field of Classification Search
CPC ......... G06F 17/30607; G06F 17/30595; G06F 9/4435; G06F 17/30575; G06F 2216/01; G06F 17/30336; G06F 17/30631
USPC ........... 707/600–831, 899, 999.001–999.206
See application file for complete search history.

(56) References Cited

U.S. PATENT DOCUMENTS

| | | |
|---|---|---|
| 6,785,882 B1 | 8/2004 | Goiffon et al. |
| 7,047,242 B1 | 5/2006 | Ponte |
| 7,320,073 B2 | 1/2008 | Zissimopoulos et al. |
| 7,640,595 B2 | 12/2009 | Chojnacki |
| 7,801,912 B2 | 9/2010 | Ransil et al. |
| 9,047,328 B2 | 6/2015 | Mooser |
| 2007/0168336 A1 | 7/2007 | Ransil et al. |
| 2012/0254175 A1 | 10/2012 | Horowitz et al. |

OTHER PUBLICATIONS

U.S. Appl. No. 13/681,347 of Mooser, J., filed Nov. 19, 2012.
Non-Final Office Action mailed May 23, 2014, for U.S. Appl. No. 13/681,347 of Mooser, J., filed Nov. 19, 2012.

(Continued)

*Primary Examiner* — Angelica Ruiz
(74) *Attorney, Agent, or Firm* — Perkins Coie LLP

(57) ABSTRACT

Disclosed are a method and system for searching entities and keys that are associated with each other using entity-key associations stored in an in-memory object. When a query is issued for retrieving entity-key associations, the disclosed technique searches an in-memory object, such as a binary large object (BLOB) containing a plurality of entity-key association strings that represent the entity-key associations. An entity-key association string includes an entity name of an entity concatenated with a key name of a key that are associated with each other. Searching for the entity-key associations using the entity-key association strings in the BLOB is faster than a conventional search that includes querying multiple tables in a database. The disclosed technique creates the entity-key association strings by reading necessary data from a data structure stored in data storage unit. Both literal and regular expressions are supported without adversely affecting the query performance.

20 Claims, 7 Drawing Sheets

(56) References Cited

OTHER PUBLICATIONS

Final Office Action mailed Dec. 18, 2014, for U.S. Appl. No. 13/681,347 of Mooser, J., filed Nov. 19, 2012.
Notice of Allowance Mailed Mar. 4, 2015, for U.S. Appl. No. 13/681,347 of Mooser, J., filed Nov. 19, 2012.

BLOB = {computer1.domainA@@@system.cpuUsage\n
computer1.domainA@@@system.memUsage\n
tablet1.domainA@@@system.noOfApps\n
. . . . . . .}

Metafile = 1001-1010: {storageserver.A=>500}
1011-1020: {storageserver.A=>1073}
. . .
10XX-10YY: {storageserver.123=>752}

SEARCHING ENTITY-KEY ASSOCIATIONS USING IN-MEMORY OBJECTS

CROSS-REFERENCE TO RELATED APPLICATION

This application is a continuation of U.S. patent application Ser. No. 13/681,347, filed on Nov. 19, 2012, entitled "SEARCHING ENTITY-KEY ASSOCIATIONS USING IN-MEMORY OBJECTS", which is incorporated herein by reference in its entirety.

FIELD OF INVENTION

This invention generally relates to search techniques in computer related technologies. More specifically, the invention relates to storing an index of entity-key associations in an in-memory object to enable faster search of associated entities and keys.

BACKGROUND

In computer related technologies, searching a database is a complex process that consumes significant computing resources. Certain searching techniques use an index that makes the search faster and more efficient. An index may include a data structure that improves the speed of data retrieval operations on a database table, but at the cost of slower writes and increased consumption of storage space. Indices can be created using one or more columns of a database table, providing the basis for both rapid random lookups and efficient access of ordered records. In a relational database, an index can be a copy of one part of a table, for example, a column of a table.

However, searching database tables can become relatively time consuming when the query requests results for which multiple tables have to be searched. The performance of the search may deteriorate even further if the query parameters include regular expressions and not exact names or values of the column.

Consider an example scenario where a search needs to retrieve entities and keys that are associated with each other. The entities may include, for example, names of software applications installed in a computer system and keys may include names of features provided by the software applications in the computer system. A software application and a feature are said to be associated with each other if the software application provides that feature. Further, consider an example in which information regarding software applications is stored in a "software_application" table of a database, information regarding features of the computer system is stored in a "features" table and the associations between the software applications and the features are stored in a "softwareapplication_features" table. Consider that the query may be intended to fetch names of all software applications and names of their associated features wherein the software application name has "XYZ" in its name and the feature has "123" in its name.

Such a query in the above example requires searching at least three tables and then filtering out the results that do not satisfy the query parameters. It may require scanning all rows in the "software_application" table to find the software applications that have substring "XYZ" in their names, then scanning all rows in "features" table to find features with substring "123" in their names and then finding the related software applications and features using the "software_features" table. Search techniques involving querying multiple tables in a database consume significant amount of computing resources. The efficiency of such techniques further diminishes as the table size increases or the associations become more complex.

The information regarding associations could be used in various applications for various purposes. For example, they could be used to analyze the performance of a set of computers in a network, analyze various aspects of an organization, generate reports, etc. that may provide valuable information. The information regarding associations could be obtained frequently and regularly by various applications, users, etc. Accordingly, it may be important to provide the information regarding associations to the requesting applications without any significant delay.

SUMMARY

Introduced here are a method and system for searching entities and keys that are associated with each other, by using entity-key associations stored in an in-memory object. The disclosed technique creates a plurality of entity-key association strings that represent associations of various entities and keys, and stores them in an in-memory object, such as a binary large object (BLOB). An entity-key association string includes an entity name of an entity concatenated with a key name of a key. The disclosed technique also creates another in-memory object that includes association value identification (ID) of association values corresponding to the entity-key associations represented by the entity-key association strings in the BLOB. The entity-key associations are determined from various data in a data storage unit including (a) a plurality of entities, (b) a plurality of keys and (c) the associations between entities and keys and (d) association values for each of the entity-key associations.

When a query is issued for retrieving entity-key associations, the disclosed technique searches the entity-key association strings in the BLOB and retrieves the entity-key associations. Retrieving the entity-key associations using the entity-key association strings in the BLOB is significantly faster than a conventional search that includes querying multiple tables in a database. Further, the disclosed technique supports searching using both literal expressions and regular expressions without adversely affecting the performance.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are a method and system for searching entities and keys that are associated with each other, by using entity-key associations stored in an in-memory object. The disclosed technique creates a plurality of entity-key association strings that represent associations of various entities and keys, and stores them in an in-memory object, such as a BLOB. An entity-key association string includes an entity name of an entity concatenated with a key name of a key that are associated with each other. The disclosed technique also creates another in-memory object that includes association values corresponding to the entity-key associations represented by the entity-key association strings in the BLOB. The entity-key associations are determined from various data in a data storage unit including (a) a plurality of entities, (b) a plurality of keys and (c) the associations between entities and keys and (d) association values for each of the entity-key associations.

When a query is issued for retrieving entity-key associations, the disclosed technique searches the entity-key association strings in the BLOB and retrieves the entity-key associations. Retrieving the entity-key associations using the entity-key association strings in the BLOB is significantly faster than a conventional search that includes querying multiple tables in a database. Further, the disclosed technique supports searching using both literal expressions and regular expressions without adversely affecting the performance.

Figure 1:
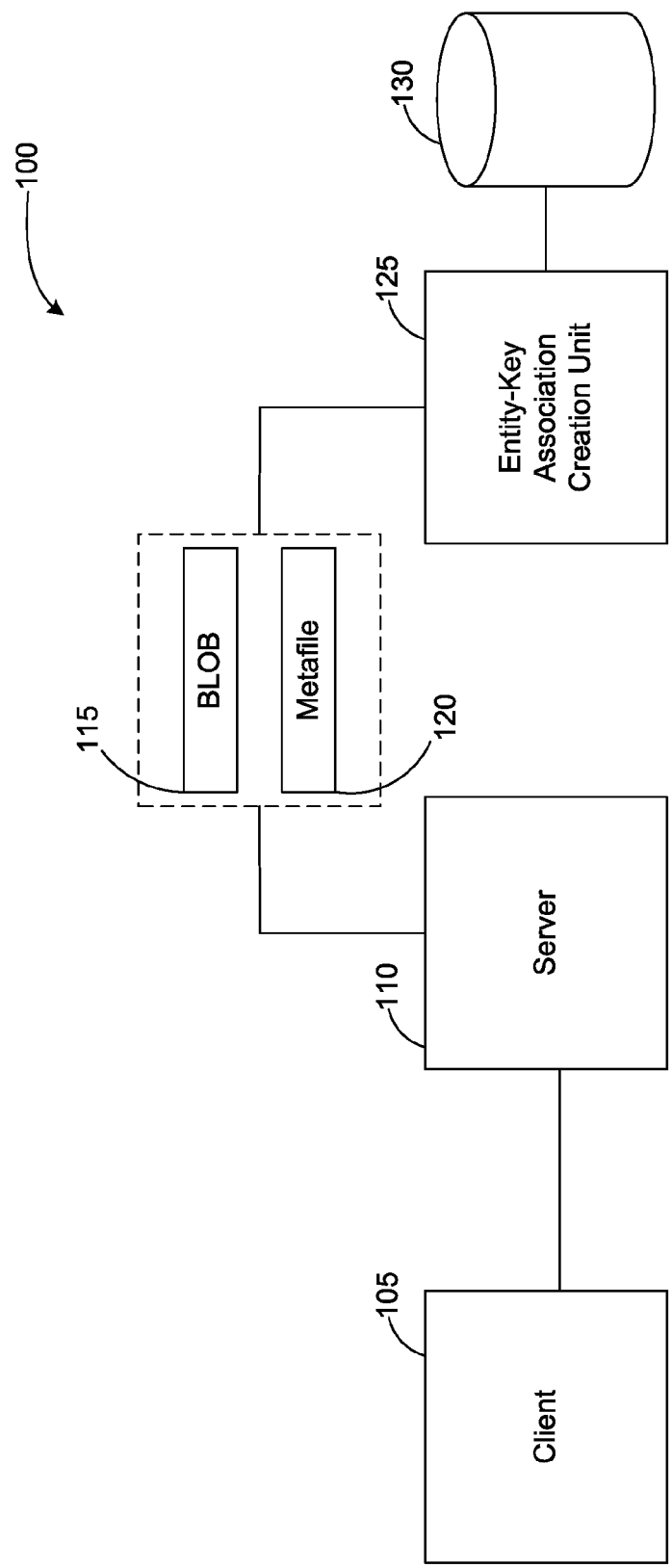
FIG. 1 is a distributed environment in which an embodiment of the invention may operate.

FIG. 1 is a distributed environment in which an embodiment of the invention may operate. The environment includes a system 100 for searching entity-key associations (may also be referred to as "associations" henceforth) using a BLOB file. The system 100 includes a client 105 requesting a server 110 to retrieve associations. The server 110 searches for the associations in a BLOB file 115 that is loaded in a memory of the server 110 and retrieves the associations. Further, the server 110 also retrieves association values corresponding to the retrieved associations from a metafile 120 that is also loaded into the memory of the server 110.

An "entity" as the term is used herein, can be any object, article, product, service, organization etc. For example, an entity can include a computer name, software name, location name, person's name, organization's name etc. A key may include a property of an entity such as a processing unit usage, memory usage, or configuration of a computer; a number of lines of code or type of software; number of employees in an organization, organization revenue, products of an organization etc. An entity is associated with a particular key and their association has a value. For example, an entity "computer 123" can have an associated key such as "processing unit usage." Further, their association may have a value, for example, "4346" indicating that there are 4346 processes or threads running in "computer 123." Such a value may alternatively indicate any other metric.

Searching for the associations in the in-memory BLOB file 115 is significantly faster than searching for associations that are stored in multiple tables of a data storage unit 130. The data storage unit 130 can include, for example, a relational database or a non-relational database. An entity-key association creation unit 125 creates the BLOB file 115 and the metafile 120, based on information derived from entities, keys, entity-key associations and association values stored in the data storage unit 130, and loads them into the memory of the server 110.

The BLOB file 115 includes a plurality of association strings that represent a plurality of entity-key associations. Each of the association strings includes entity identification (ID) of an entity concatenated with a key ID of a key that are associated with each other. The ID can include a name of the entity and/or the key. For example, if an entity having a name "computer123" is associated with a key having a name "memory.capacity," their association may be represented by association string "computer123@@@memory.capacity" in the BLOB file 115. The "@@@" in the association string is a delimiter that is used to separate an entity name and a key name in the association string. In another example, the delimiter may include any another string. Further, each of the association strings may be separated by another delimiter such as, for example, "\n," a new line separator which implies that each of the association strings starts in a new line of the BLOB file 115.

When the BLOB file 115 is loaded into the memory of the server 110, the BLOB file 115 is allocated contiguous blocks of the memory. That is, the BLOB file is stored in sequential blocks of memory, which facilitates a faster search. Further, since the search performed in the BLOB file is a string search, searching using regular expressions, which is still a string search, does not adversely impact the performance. The metafile 120 may include association value IDs of association values corresponding to the associations represented by the association strings in the BLOB file 115.

Figure 2:
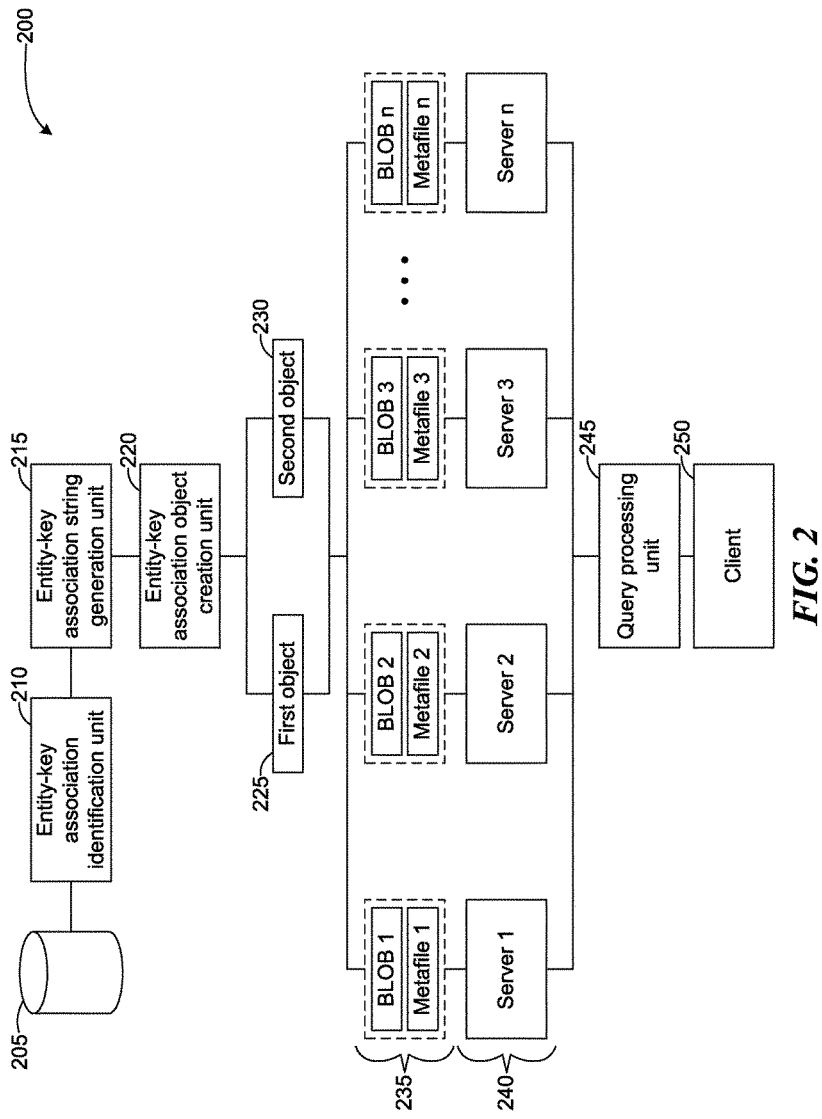
FIG. 2 is a block diagram of a system for creating entity-key association strings in in-memory objects and for searching entity-key associations using the in-memory objects.

FIG. 2 is a block diagram of a system 200 for creating entity-key association strings in in-memory objects and for searching entity-key associations using the in-memory objects, according to an embodiment of the disclosed technique. Although the diagrams depict components as functionally separate, such depiction is merely for illustrative purposes. It will be apparent to those skilled in the art that at least some of the components portrayed in this figure can be combined or further divided into separate components. The system 200 can be an embodiment of system 100 of FIG. 1. A query processing unit 245 receives a query from a client 250 for retrieving entity-key associations. The query processing unit 245 distributes the query to a plurality of servers 240 in a computer network.

Each of the servers 240 searches for the entity-key associations in the BLOB files of their respective in-memory objects 235. The BLOB files of the in-memory objects 235 include association strings that represent associations of entities and keys. The metafiles of the in-memory objects 235 include association value IDs that are used to obtain association values of the associations represented by the association strings in the BLOB files. The system 200 obtains the association values of the associations from the data storage unit 205 using the association value IDs. The servers 240 retrieve the entity-key associations and the corresponding association values using their respective in-memory objects 235 and return them to the query processing unit 245. The query processing unit 245 collates the result from each of the servers 240 and returns the result to the client 250.

The information regarding entities, keys and associations are retrieved from a data storage unit 205, such as a database. The information regarding entities, keys, entity-key associations can be stored in various tables or as an index in the of the data storage unit 205. For example, a list of entities can be stored in an "entity" table, a list keys can be stored in a "key" table, and the entity-key associations can be stored in "keyentity" table. In another example, the entity-key associations may be stored as an index having entities, associated keys and association values, in the data storage unit 205. Searching through a database table can consume significant computing resources. Further, a search may consume even more computing resources if the query parameters include regular expressions or only a portion of the name of the entity or the key a user is looking for. For example, a query for retrieving entities having "XYZ" in their name from the data storage unit 205 typically consumes more computing resources than a query for retrieving entities with name "123XYZ." Accordingly, at least to minimize the amount of time taken to retrieve the results, the entity-key associations from the data storage unit 205 are stored as entity-key association strings in an in-memory object such as a BLOB file.

Figure 3A:
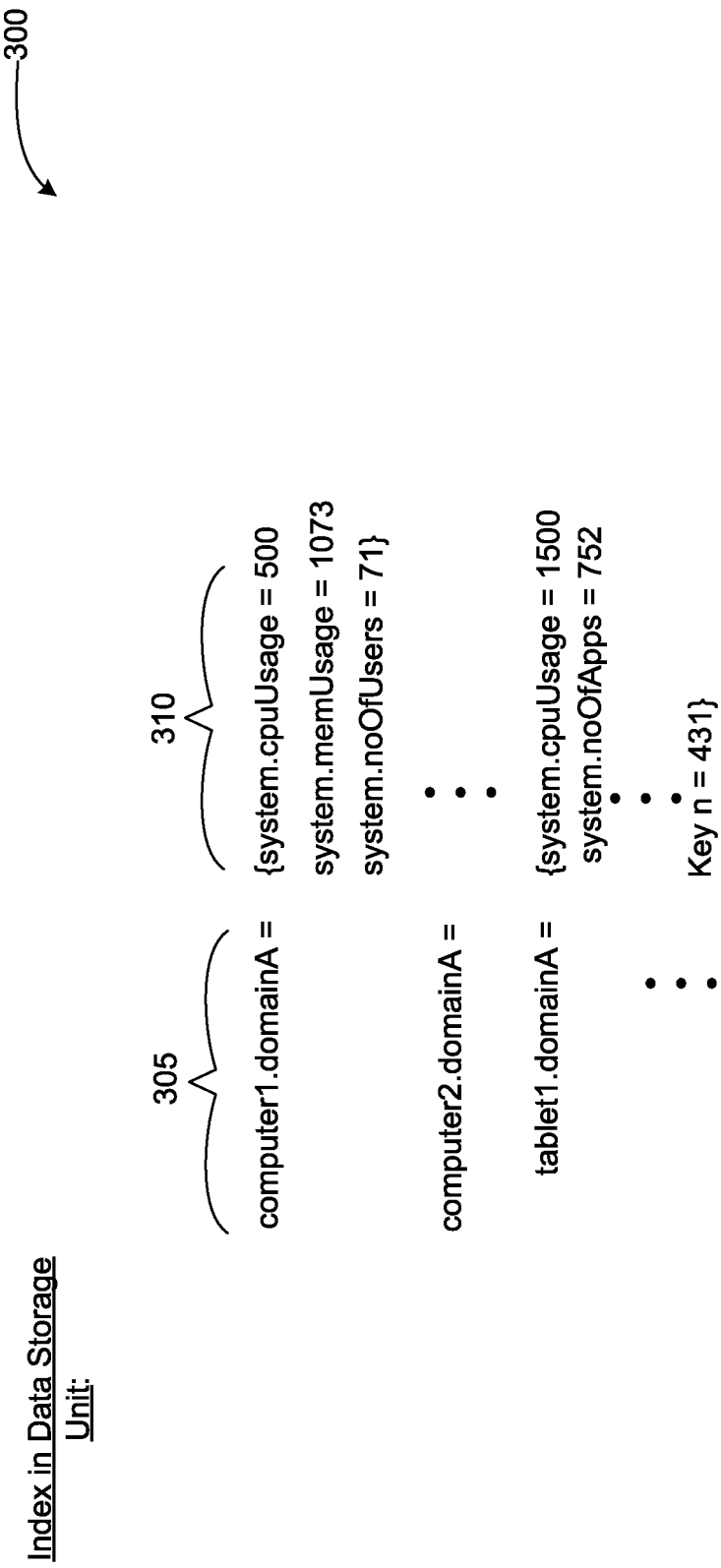
FIGS. 3(*a*), 3(*b*) and 3(*c*) collectively illustrate an example of an entity-key association index in a data structure and in-memory objects for the entity-key association index.
Figures 3B, 3C:

An entity-key association identification unit 210 determines and/or identifies the entity-key associations from the data storage unit 205, for example, by reading the various tables or an index in the data storage unit 205. An entity-key association string generation unit 215 creates an entity-key association string for each of the entity-key associations identified by the entity-key association identification unit 210. Further, an entity-key association object creation unit 220 creates a first object 225, such as a BLOB file, containing the entity-key association strings and a second object 230, such as a metafile, containing association value IDs of association values corresponding to the associations represented by the association strings in the BLOB. FIGS. 3(a), 3(b) and 3(c) illustrate examples of an index in a data storage unit 205, a BLOB and a metafile, respectively. The first object 225 containing the association strings is generated as a BLOB to facilitate faster searching of the entity-key associations. The BLOB file, when loaded into a memory of a computer, is typically allocated contiguous blocks of memory and thus holds the entity-key association strings in contiguous blocks, which makes searching for the association strings faster.

A system such as, for example, a social networking system having millions of users, typically includes a significant number of computer systems. Accordingly, the number of entities and keys that exist in the system is very large. Therefore, a size of the BLOB file having the entity-key association strings would also be very large, for example, multiple Gigabytes. Server constraints may not allow loading of such a large BLOB file into a memory of a single server. Accordingly, in one embodiment, the BLOB file and the metafile are split into a plurality of shards, and a configurable number of shards are distributed to each of the servers 240 in the system 200. The shards are then loaded into a memory of each of the servers 240. Each of the shards contains a subset of association strings from the first object 225 (BLOB file) and the corresponding association value IDs from the second object 230 (metafile). A query from the client 250 is distributed to the servers 240 and the servers 240 search their respective BLOB files, in parallel, and return the results to the client 250. Searching in parallel reduces the time taken to retrieve the results significantly. Accordingly, the disclosed technique reduces the time needed to retrieve the associations significantly by performing the search (i) in in-memory objects and (ii) in parallel by a plurality of servers.

The index in the data storage unit 205 may be updated as and when new entities or keys are added to the system 200. Such new entities, keys, or associations added to the index are also added to the first object 225 as well. The entity-key association identification unit 210 is configured to check the data storage unit 205 at predefined intervals to determine if any new entities, keys or associations are added or if any existing ones are modified or deleted from the index. If any new entities, keys or associations are added or if any of the existing ones are modified or deleted from the index, the first object 225 and the second object 230 are updated accordingly.

FIG. 3(a) illustrates an example of an index 300 in the data storage unit 205 of FIG. 2 having entities 305, keys 310, and their association value IDs. The index 300 includes entities 305 such as, for example, "computer1.domainA," "computer2.domainA," "tablet1.domainA," "computer1.domainB," etc. The index 300 also includes keys 310 that are associated with the above entities. For example, entity "computer1.domainA" is associated with keys "system.cpuUsage," "system.memUsage," "system.noOfUsers," etc., and entity "tablet1.domainA" is associated with keys "system.cpuUsage," "system.noOfApps," etc. Further, each of these associations has a value which can be obtained using the association value ID included in the index 300. For example, the association of the entity "computer1.domainA" and key "system.cpuUsage" has an association value ID "500." The association value ID "500" indicates that an association value for "system.cpuUsage" of "computer1.domainA" can be obtained (for example, from a certain table in a data storage unit 205) using the association value ID "500."

The associations in the above index 300 are converted to association strings and stored in the BLOB file 325 as illustrated in FIG. 3(b). For example, the association between the entity "computer1.domainA" and key "system.cpuUsage," is stored as an association string "computer1.domainA@@@system.cpuUsage." The "@@@" in the association string is a delimiter that is used to separate an entity name and a key name in the association string. In another example, the delimiter may include any another string. Further, each of the association strings may be separated by another delimiter such as, for example, "\n", a line separator that causes each of the association strings to start in a new line of the BLOB file 325. In another example, each of the association strings may be separated by another delimiter.

FIG. 3(c) illustrates a metafile 350 that stores association value IDs which are used to obtain association values of the associations represented by the corresponding association strings. Though the metafile can have a format such as described below, it may be generated in any other convenient format that allows the association values to be obtained efficiently. An example entry in the metafile 350 may read as "1000-1010:{storageserver.A.>500}," where "1000-1010" refers to byte offset of the association string in the BLOB file to which the association value ID "500" corresponds. For example, consider that the byte offset "1000-1010" corresponds to association string "computer1.domainA@@@system.cpuUsage." The association value ID "500" indicates that an association value for an association represented by the association string "computer1.domainA@@@system.cpuUsage," may be obtained from a location such as "storageserver.A" using the association value ID "500." The "storageserver.A" can have the association value stored in, for example, a database table.

In another example, the metafile 350 can have the association value IDs in the same order as the association strings in the BLOB file 325. For example, in the metafile 350, the first entry "1000-1010:{storageserver.A.>500}," corresponds to the first association string "computer1.domainA@@@system.cpuUsage" and a second entry "1010-1020:{storageserver.A.>1073}," may correspond to the second association string "computer1.domainA@@@system.memUsage" in the BLOB file 325. Further, each of the association value IDs is separated by a delimiter, for example, a new line separator "\n." This way, the association valued ID can be fetched quickly once the association string is identified from the BLOB file 325.

The association values are not stored directly in the metafile 350 since the association values can change continuously and dynamically. For example, a CPU usage may change every millisecond. Accordingly, if such values are stored in the metafile directly, they may become stale the moment after the metafile 350 is created. Further, if the metafile was created long before a query is received and served, the association values may be of no use to the user.

Figure 4:
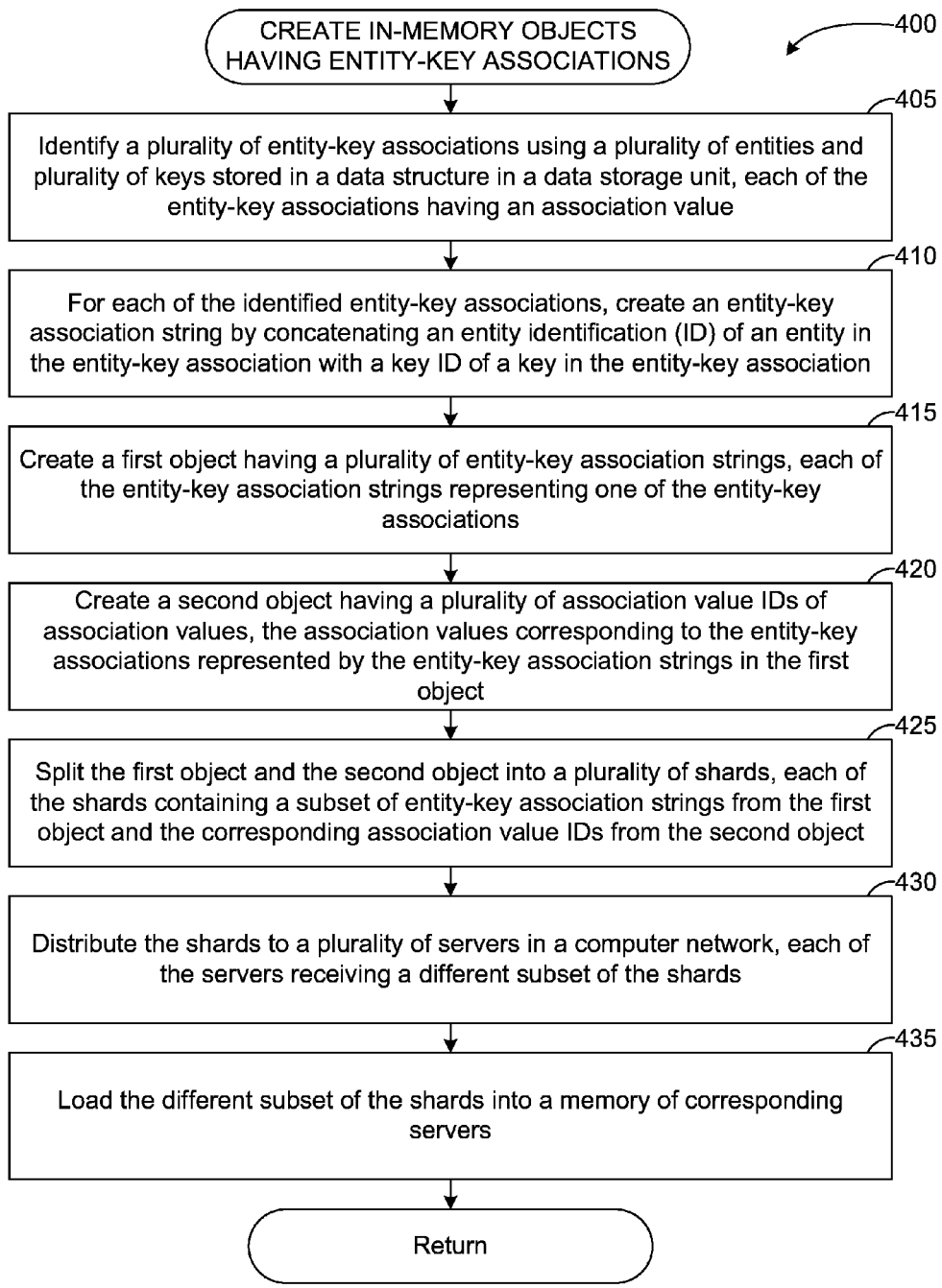
FIG. 4 is a flow diagram of a process of creating in-memory objects having entity-key associations.

FIG. 4 is a flow diagram illustrating a process 400 of creating in-memory objects having entity-key associations and association value IDs, according to an embodiment of the disclosed technique. The process 400 can be executed in a system such as system 200 of FIG. 2. At step 405, an entity-key association identifying unit identifies a plurality of entity-key associations based on a plurality of entities and plurality of keys stored in a data structure in a data storage unit. The data structure can be an index of entities, an index of keys, or an index of entities and associated keys. Each of the entity-key associations has an association value.

At step 410, an entity-key association string generation unit creates, for each of the identified entity-key associations, an entity-key association string by concatenating an entity ID of the entity of the identified entity-key association with a key ID of the key of the identified entity-key association. The entity ID and the key ID are separated with a delimiter in the entity-key association string. The entity ID is considered as a string and can include a name of the entity. Similarly, the key ID is considered as a string and can include a name of the key.

At step 415, an entity-key association object creation unit creates a first object, such as a BLOB file, and stores the entity-key association strings in the BLOB file. The BLOB file, when loaded into a memory, is allocated contiguous blocks of memory and, thus, facilitates faster searching in sequential blocks. At step 420, the entity-key association object creation unit creates a second object, such as a metafile, and stores the association value IDs of association values of the corresponding entity-key associations represented by the entity-key association strings in the BLOB file.

At step 425, the entity-key association object creation unit splits the BLOB file and the metafile into a plurality of shards. Each of the shards includes a subset of the entity-association strings of the BLOB file and the corresponding association value IDs from the metafile. At step 430, the entity-key association object creation unit distributes the shards to a plurality of servers in a computer network. Each of the servers receives a configurable number of the shards and loads the shards into its memory.

Figure 5:
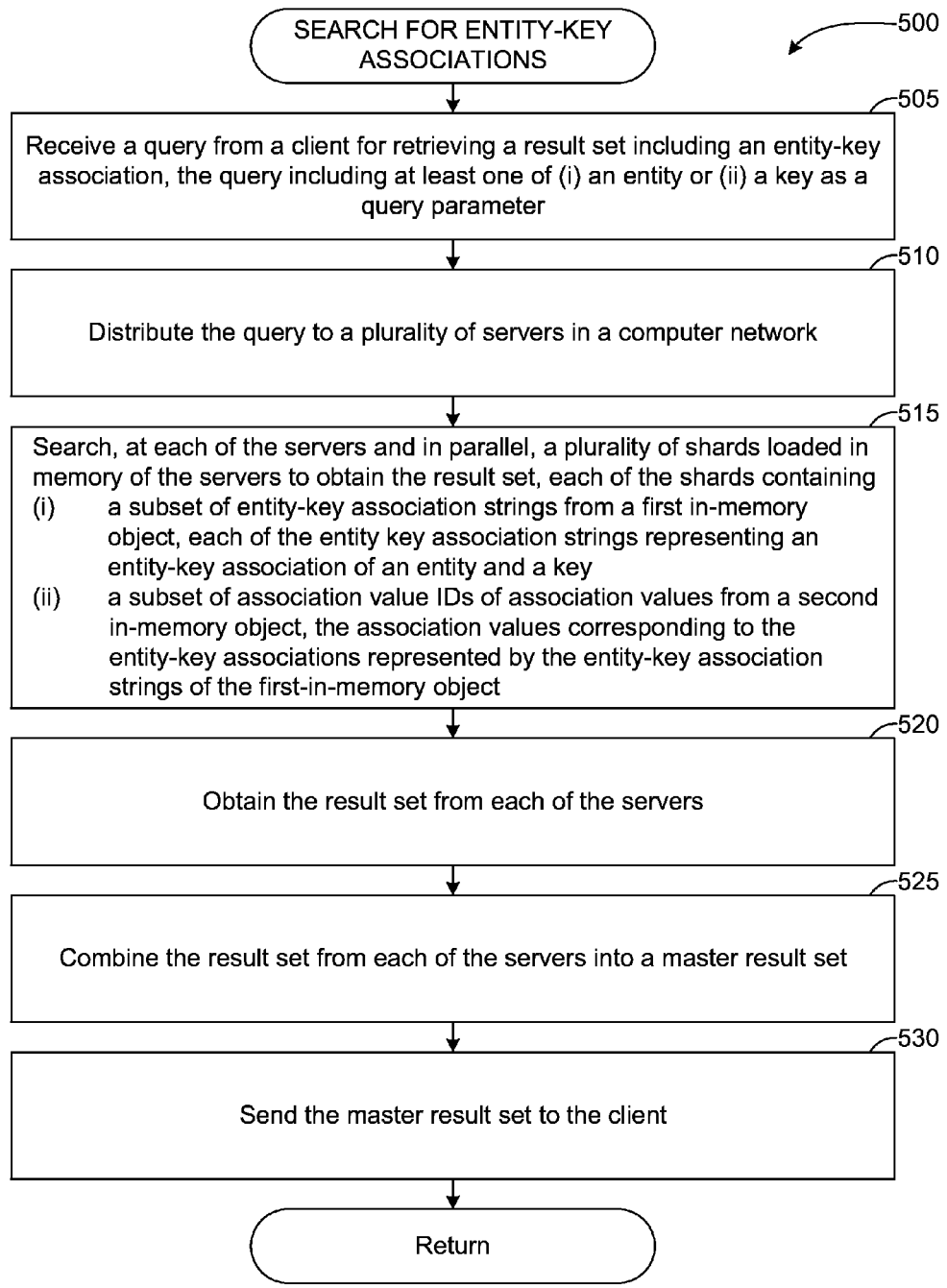
FIG. 5 is a flow diagram of a process of searching entity-key associations using in-memory objects.

FIG. 5 is a flow diagram illustrating a process 500 for searching entity-key associations using in-memory objects such as created in the process 400 of FIG. 4, according to an embodiment of the disclosed technique. The process 500 may be executed in a system such as system 200 of FIG. 2. At step 505, a query processing unit receives a query from a client for retrieving entity-key associations. The query can include query parameters such as entity IDs or key IDs. The entity IDs or the key IDs can be expressed in full or in part using regular expressions. For example, the entity ID may be expressed in full as "computer1.domainA" or in part using regular expression as "comp*.dom*."

At step 510, the query processing unit distributes the query to a plurality of servers in the computer network. At step 515, each of the servers searches a number of shards loaded in the memory of the server and retrieves a result set including the entity-key associations and association values based on the query parameters. All the servers execute the query in parallel. Each of the shards in the memory includes (i) a BLOB file which contains entity-key association strings of a subset of entity-key associations in the system and (ii) a metafile which contains association value IDs of association values of entity-key associations represented by the corresponding entity-key association strings in the BLOB file.

At step 520, the result set is obtained from each of the servers. The associations are obtained using the association strings from the BLOB file and the association values are obtained using the association value IDs from the metafile. At step 525, the query processing unit combines the result set obtained from each of the servers into one master result set. At step 530, the query processing unit returns the master result set to the client.

The above disclosed techniques can be used in various applications, such as generating reports, managing networks, etc. The disclosed techniques may also be used for providing a "type ahead" feature in a user interface. Consider a user interface that has an input field that accepts an entity-key association as an input. As the user types an entity name in the input field, the application suggests, to the user, a list of keys that are associated with the typed entity. The user may then select one or more keys from the suggested list and input the key(s). This feature improves user experience, by at least eliminating the need for the user to (a) type the whole entity/key name and (b) remember associated entities and keys. In the absence of this feature, the user may have to remember the associated entities and keys or the user may have to input the entities and keys using trial and error techniques.

Further, the disclosed techniques may be used for searching strings in general. For example, the BLOB files may contain only keys or only entities instead of entity-key associations. The advantages of searching using a BLOB file include: (i) searching an in-memory object is relatively faster than searching a database table (ii) searching contents of in-memory object such as a BLOB file is even faster since the contents are stored in contiguous blocks of the memory and (iii) the query performance is not impacted even when the query includes parameters expressed as a regular expression.

Figure 6:
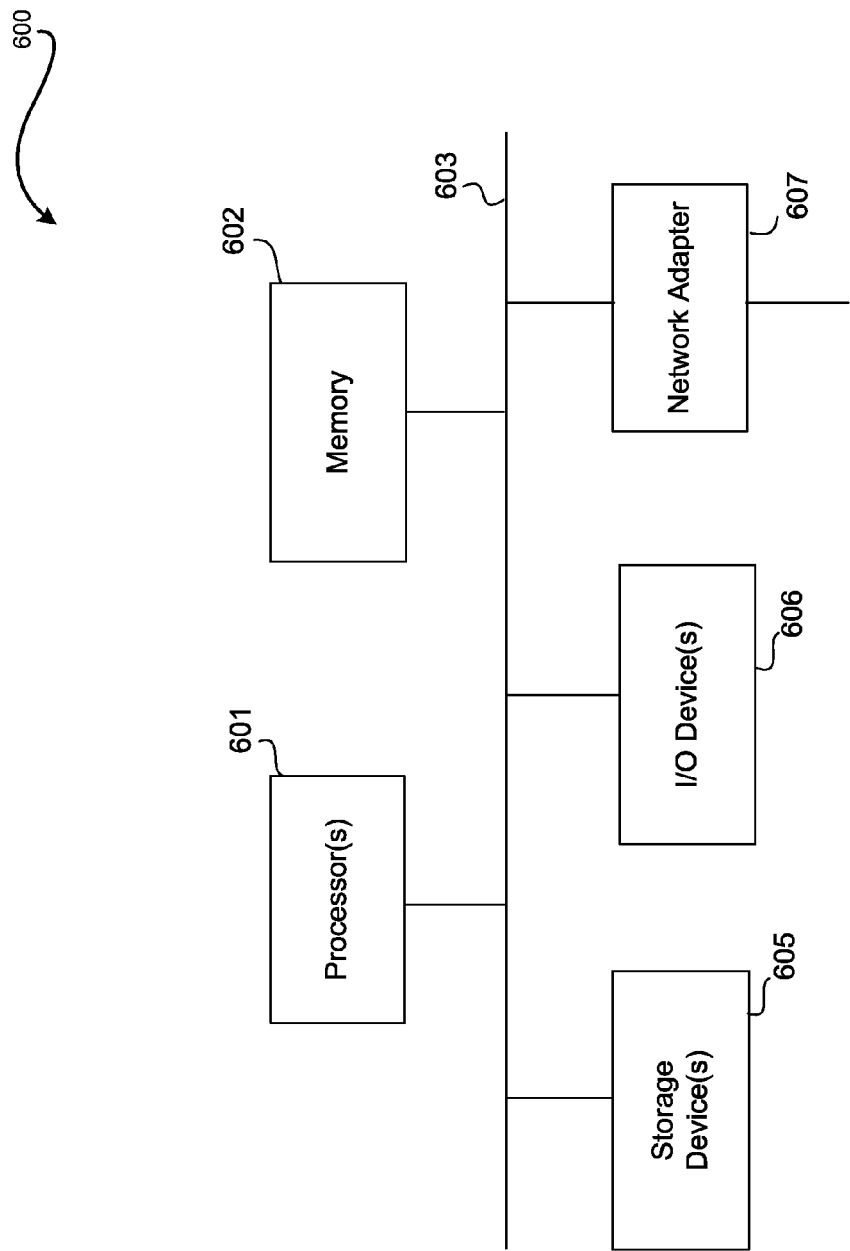
FIG. 6 is a block diagram of a processing system that can implement operations of the present invention.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented, such as a server, client, storage devices, databases, query processing unit, entity-key association string generation unit, entity-key association object generation unit etc. The processing system 600 includes one or more processors 601 and memory 602 coupled to an interconnect 603. The interconnect 603 is shown in FIG. 6 as an abstraction that represents any one or more separate physical buses, point to point connections, or both connected by appropriate bridges, adapters, or controllers. The interconnect 603, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 601 is/are the central processing unit (CPU) of the processing system 600 and, thus, control the overall operation of the processing system 600. In certain embodiments, the processor(s) 601 accomplish this by executing software or firmware stored in memory 602. The processor(s) 601 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 602 is or includes the main memory of the processing system 600. The memory 602 represents any form of random access memory (RAM), read-only memory (ROM), flash memory, or the like, or a combination of such devices. In use, the memory 602 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 601 through the interconnect 603 are a network adapter 607, a storage device(s) 605 and I/O device(s) 606. The network adapter 607 provides the processing system 600 with the ability to communicate with remote devices, over a network and may be, for example, an Ethernet adapter or Fibre Channel adapter. The network adapter 607 may also provide the processing system 600 with the ability to communicate with other computers within the cluster. In some embodiments, the processing system 600 may use more than one network adapter to deal with the communications within and outside of the cluster separately.

The I/O device(s) 606 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 602 can be implemented as software and/or firmware to program the processor(s) 601 to carry out actions described above. In certain embodiments, such software or firmware may be initially provided to the processing system 600 by downloading it from a remote system through the processing system 600 (e.g., via network adapter 607).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 605 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
   identifying, for multiple entities and multiple keys stored in a data structure in a data storage unit, multiple entity-key associations, wherein at least some of the entity-key associations includes an entity and a key that are associated with each other;
   creating, for each of the entity-key associations, an entity-key association string by concatenating an entity identification (ID) of the entity in the entity-key association with a key ID of the key in the entity-key association, to produce multiple entity-key association strings;
   creating a first in-memory object in a computer system to store the entity-key association strings, the entity-key association strings representing the entity-key associations; and
   performing a search using the first in-memory object to retrieve at least one of (i) an entity-key association of the multiple entity-key associations, or (ii) an association value of the entity-key association.

2. The method of claim 1, wherein the first in-memory object is a binary large object (BLOB).

3. The method of claim 2, wherein the BLOB stores the entity-key association strings in contiguous blocks of memory in the computer system.

4. The method of claim 1, wherein each of the entity ID and key ID is a string.

5. The method of claim 1, wherein at least some of the entity-key associations have corresponding association values.

6. The method of claim 5 further comprising:
   creating a second in-memory object to store multiple association value IDs for the entity-key association strings in the first in-memory object, the association value IDs used to retrieve the association values of the entity-key associations represented by the entity-key association strings.

7. The method of claim 6, wherein the second in-memory object is a metafile, the metafile including:
a byte offset of a specified entity-key association string of the entity-key association strings in the first in-memory object,
a specified association value ID for the specified entity-key association string, and
a storage location from where an association value of a specified entity-key association represented by the specified entity-key association string is to be retrieved from using the specified association value ID.

8. The method of claim 6, wherein creating the first in-memory object and the second in-memory object includes:
splitting the first in-memory object and the second in-memory object into multiple shards, wherein at least some of the shards include a subset of the entity-key associations from the first in-memory object and corresponding association value IDs from the second in-memory object,
distributing the shards to multiple servers in a computer network, and
loading the shards into a memory of at least some of the servers.

9. The method of claim 8, wherein performing the search includes:
receiving, from a client in the computer network, a query for retrieving a result set including at least one of (i) the entity-key association, or (ii) the association value of the entity-key association, the query including a query parameter that identifies at least one of (i) an entity, or (ii) a key;
searching, at least some of the servers in parallel and in response to the query, the shards to obtain the result set based on the query parameter;
obtaining the result set from the servers; and
sending the result set to the client.

10. The method of claim 8 further comprising:
receiving, from a user in a computer user interface that accepts the entity-key association as an input, an entity or a key; and
suggesting, to the user, the other of the entity or the key, wherein the other of the entity or the key is associated with the entity or the key received from the user, and wherein both the entity or the key received from the user and the suggested other of the entity or the key collectively form the input to the computer user interface.

11. The method of claim 1 further comprising:
updating the entity-key association strings in the first in-memory object when the entities or the keys or the entity-key associations in the data structure are updated.

12. The method of claim 1, wherein creating the entity-key association string includes adding a first string delimiter between the entity ID and the key ID in the entity-key association string.

13. The method of claim 1, where in each of the entity-key association strings in the first in-memory object is separated by a second string delimiter.

14. A non-transitory computer-readable storage medium storing computer-readable instructions, the instructions comprising:

instructions for receiving, from a client in a computer system, a query for retrieving a value of a key associated with an entity, the query including (i) an entity ID of the entity (ii) a key ID of the key;
instructions for searching, at a server in the computer system in response to the query, a first in-memory object having multiple entity-key association strings to obtain an entity-key association string that identifies an entity-key association of the entity and the key, the entity-key association string created by concatenating the entity ID of the entity with the key ID of the key;
instructions for obtaining the entity-key association string from the first in-memory object;
instructions for obtaining an association value ID of the entity-key association corresponding to the entity-key association string from a second in-memory object, the obtaining further including obtaining the value of the key from a storage location using the association value ID; and
instructions for sending the value of the key to the client.

15. The computer-readable storage medium of claim 14, wherein the first in-memory object is a BLOB.

16. The computer-readable storage medium of claim 14, wherein the second in-memory object is a metafile, the metafile including:
a byte offset of the entity-key association string in the first in-memory object,
the association value ID for the entity-key association string, and
the storage location from where the value of the key is to be retrieved from using the association value ID.

17. The computer-readable storage medium of claim 14, wherein the instructions for searching the first in-memory object to obtain the entity-key association string includes instructions for:
adding a first string delimiter between the entity ID and the key ID in the entity-key association string.

18. The computer-readable storage medium of claim 14, wherein searching the first in-memory object at the server includes:
searching, at multiple servers in a computer network and in parallel, multiple shards, each of the shards containing a subset of the entity-key associations from the first in-memory object and corresponding association value IDs from the second in-memory object, at least some of the servers having a different subset of the shards, and the different subset of the shards loaded into a memory of corresponding servers.

19. An apparatus comprising:
a processor;
an entity-key association string generation unit to generate an entity-key association string that represents an entity-key association of an entity and a key associated with the entity in a computing system, the entity key association string generation unit configured to generate the entity-key association string by concatenating an entity identification (ID) of the entity with a key ID of the key;
an entity-key association object creation unit to create:
a first in-memory object to store multiple entity-key association strings, the entity-key association strings corresponding to multiple entity-key associations, the entity-key associations representing associations between multiple entities and multiple keys in the computing system, and
a second in-memory object to store multiple association value IDs corresponding to the entity key associating strings, the association value IDs specifying a storage location of the association values of the entity-key associations represented by the entity-key association strings; and a query processing unit configured to perform a search using the first in-memory object to retrieve at least one of (i) an entity-key association of the multiple entity-key associations, or (ii) an association value of the entity-key association.

20. The apparatus of claim 19, wherein the query processing unit is configured to:

receive a query, from a client, for retrieving a value of a specified key of the keys associated with a specified entity of the entities, obtain an entity-key association string from the first in-memory object, that identifies a specified entity-key association of the specified entity and the specified key, obtain an association value ID corresponding to the specified entity-key association string from the second in-memory object, and further obtain the value of the specified key from a storage location specified by the association value ID, and send the value of the key to the client.

* * * * *